Dec. 3, 1968 T. L. McCORMACK ET AL 3,414,892

MEANS INTERCONNECTING PRINTED CIRCUIT MEMORY PLANES

Filed Dec. 26, 1967 2 Sheets-Sheet 1

INVENTORS
THOMAS L. McCORMACK
MAURICE A. MORIN
DONALD I. STAFFIERE
BY Kenway, Jenney & Hildreth
ATTORNEYS Dec. 3, 1968 T. L. McCORMACK ET AL 3,414,892

MEANS INTERCONNECTING PRINTED CIRCUIT MEMORY PLANES

Filed Dec. 26, 1967 2 Sheets-Sheet 2

INVENTORS
THOMAS L. McCORMACK
MAURICE A. MORIN
DONALD I. STAFFIERE
Kenway, Jenney & Hildreth
ATTORNEYS United States Patent Office 3,414,892

Patented Dec. 3, 1968

3,414,892

MEANS INTERCONNECTING PRINTED CIRCUIT MEMORY PLANES

Thomas L. McCormack, Chelmsford, Mass., Maurice A. Morin, Nashua, N.H., and Donald T. Staffiere, Wilmington, Mass.; said Morin and said Staffiere assignors to Laboratory for Electronics, Inc., Waltham, Mass., a corporation of Delaware Filed Dec. 26, 1967, Ser. No. 699,006
(Filed under Rule 47(b) and 35 U.S.C. 118)
6 Claims. (Cl. 340—174)

ABSTRACT OF THE DISCLOSURE

A system for interconnecting memory planes in a vertically stacked array. Connector boards are inserted into vertically aligned slots cut into the edge of the array at positions contiguous with printed drive conductors. The connector boards are formed of insulating material with a series of conducting segments adjacent to and soldered to the drive conductors. Each segment is just large enough to contact two planes.

*Field of the invention*

This invention relates in general to arrays of vertically superimposed magnetic memory planes and more particularly to a system for providing electrical interconnection between the vertically arrayed planes.

*Background of the invention*

In many instances, magnetic core memory units are formed as an array of vertically stacked memory planes, each plane being formed as a matrix of interconnected magnetic cores on an insulating circuit card. On each plane the magnetic cores are arranged in columns along one coordinate and rows along the other. Each column of cores on a plane has a separate drive conductor passing through it, as does each row. The columns in vertical alignment in the array of planes are serially interconnected and the rows in vertical alignment are also serially interconnected. A square plane having a storage capacity of $4\times10^4$ bits requires eight hundred electrical connections, two hundred on each edge of the plane. A one hundred plane array providing a total bit capacity of $4\times10^6$, then requires $2\times10^4$ connections on each face. The making of efficient and reliable connections for these memory units is a significant design problem, since they affect the information storage density, reliability, and economy of manufacture of the units. The earlier techniques for such interconnection involved individual soldering of lugs and some special connector techniques which were dimensionally critical.

A magnetic memory assembly of vertically superimposed memory planes is described in United States patent application Ser. No. 699,284, filed Dec. 26, 1967 and assigned to the assignee of the entire right, title and interest of the present application. In that application, an assembly which includes electrical connections formed on the edges of the memory planes and a process for manufacturing the assembly is described. In that assembly, the drive conductors are carried to the edges of the memory planes as printed conductors and are then slotted in vertical alignment. Connecting wires are soldered into these slots in the printed conductors and are then sawed to provide, on one face of the assembly, that two adjacent planes are interconnected electrically, the next adjacent plane is isolated, at this end, from the first pair and is connected serially to the following plane, which is in turn isolated from the next one, etc. The same electrical connection arrangement is followed at the opposite side of the array of memory planes, except that the planes connected together are offset by one plane from those connected on the first side. The result is then that a conductor passes the length of the plane, is interconnected at the far end of that plane to the vertically aligned conductor on the next adjacent plane, which then passes along that plane back to the original side, where an electrical connection is made to the vertically aligned conductor on the plane next to it, etc., so that all of the drive conductors in vertical alignment are in serial connection. One of the problems associated with this technique is the requirement that, at each side, the connecting wires must be cut or sawed at every other inter-plane space.

*Summary of the invention*

In the interconnection system of this invention, an array of vertically stacked memory planes of the general configuration described in the above referred to patent application Ser. No. 699,284, has rectangular slots cut into the edges of the array such that the area of the plane immediately contiguous to at least one side of the slot is a printed conductor area. Into these vertically aligned slots are inserted relatively narrow strips of insulating circuit board having formed, on at least one face, a series of printed conductors. Each of these printed conductors extend horizontally the depth of the slot and extends vertically a distance sufficient to overlap two planes, but not three planes. When these circuit board strips are all positioned, one entire side of the memory plane array is soldered simultaneously, using a technique such as wave soldering. With appropriate spacing of the printed circuit conductors down the conductor board strip, alternate pairs of the memory planes are electrically interconnected between vertically aligned drive conductors. If a similar technique is used on the opposite edge of the memory plane array with the printed circuit conductors on the connector boards offset by one plane from those on the original edge, then all of the vertically aligned rows and columns on the memory planes are serially interconnected.

There are a number of additional advantages that may be derived from this technique. Thus, if the slot in the edges of the memory planes is cut between two conductors, yet sufficiently wide to intersect both conductors, an insulating connector strip having printed circuit conductors on both faces can perform the electrical interconnection between planes for both drive conductors. Since the board is insulating there is no electrical interconnection between the drive conductors on the same plane. If slots of this type are cut between all of the conductors on the planes and connector boards having printed circuit conductor segments symmetrically positioned on each face are used, then each drive conductor has redundant electrical connection between planes. That is, there are two facing surfaces carrying printed circuit conductor pads soldered to each drive conductor. This arrangement therefore increases the reliability of the circuitry since it reduces the probability of there being a faulty connection between drive conductors on adjacent planes, and it also provides for increased mechanical rigidity of the array since the area between the connector boards become soldered over such that there is a "slug" of solder between each of these boards.

If, on the other hand, identical slots are cut, not at every spacing between connectors, but at every other spacing between connectors, then one board having printed circuit conductor segments on two faces can again be utilized for vertically interconnecting two sets of drive conductors. In this instance, the connections are not redundant, however, the number of slots and the number of vertcial connector strips is thereby halved. This flexibility arises from the fact that the interconnecting strip is one integral unit having two faces electrically insulated from one another and a series of discrete electrical conductors insulatedly spaced from one another on each face. By varying the spacing between the conductor segments on each face, flexibility of the inter-plane connections may also be achieved. Since the connector boards are prefabricated units, then no further operations are needed after the soldering step to provide for completing the circuitry.

*Description of preferred embodiments*

Figure 1A:
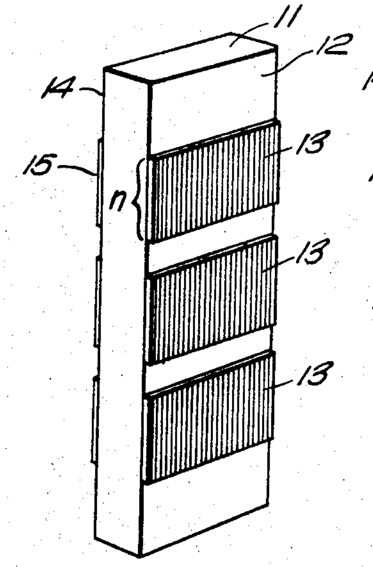
FIGS. 1*a*, 1*b* and 1*c* are perspective views of connector boards suitable for use in the practice of this invention.
Figure 1B:
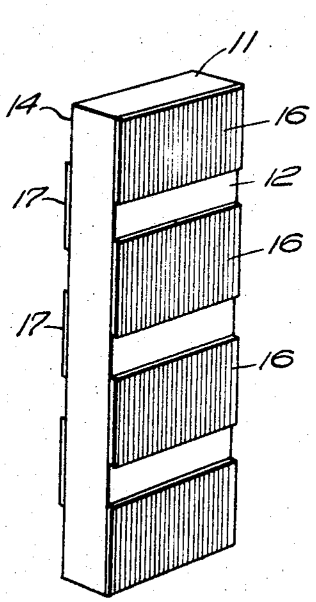
Figure 1C:
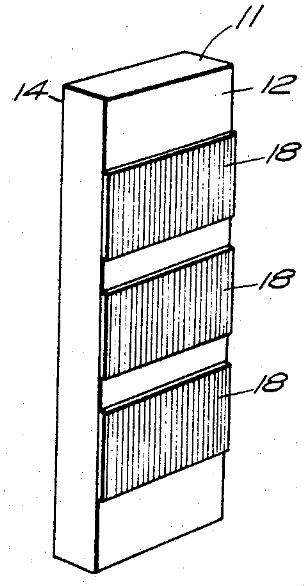

In FIGS. 1*a*, 1*b* and 1*c* there are illustrated connector boards to be used as the inter-plane connectors in memory arrays of the type described. While the connector boards illustrated in FIGS. 1*a*, 1*b* and 1*c* are suitable for interconnecting either six or eight planes, it will be understood that these connectors would conventionally be used in connecting a much greater array, for example, one hundred planes, simply by reiterating the pattern of the printed conductors on the faces of the connector boards. In FIG. 1*a*, a connector board 11 is illustrated having three printed circuit conductor segments 13 on face 12 and having identically located printed circuit conductor segments 15 located on the opposite face 14. The connector board 11 is typically formed of an insulating material such as glass epoxy laminate with the conductor pad segments 13 and 15 being formed of 1 oz. copper. Suitable dimensions for the cross section of connector board 11 are a thickness from face 14 to face 12 of .012 inch with each face having a width from edge to edge of .030 inch. The height *h* of each of the conductor segments will, of course, be controlled by the inter-plane spacing of the memory array. In the connector strip of FIG. 1*a* the printed circuit conductor segments 13 and 15 are symmetrically disposed.

Turning to FIG.1*b*, the conductor segments 16 and 17 on the insulating connector board 11 are asymmetrically disposed. Thus on face 12 the conductor segments 16 are positioned in offset relationship with the conductor segments 17 on face 14. In other respects the connector board of FIG. 1*b* is similar to FIG. 1*a*. A single sided connector board is illustrated in FIG. 1*c*. In that connector board connecting segments 18 are located only on face 12 of the connector board 11 and face 14 is left entirely insulating.

While a variety of techniques may be employed to form the connector boards of FIG. 1*a*, 1*b* and 1*c*, one suitable method is to etch insulating paths on a copper clad circuit board.

Figures 2, 2A, 2B:
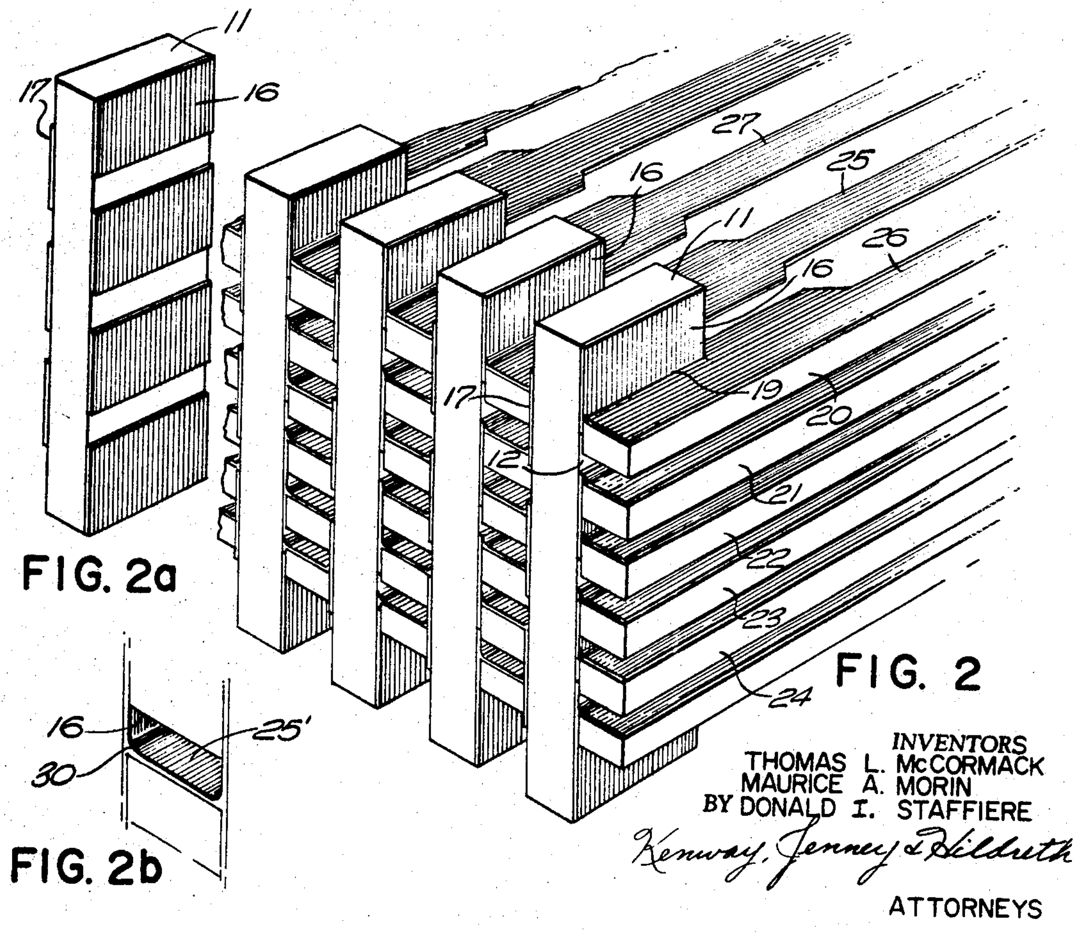
FIG. 2 is a prespective view of a portion of a memory array utilizing the connector systems of this invention.
FIG. 2*a* is a perspective view of the connector board utilized in the assembly of FIG. 2.
FIG. 2*b* is an enlarged portion of the assembly of FIG. 2 illustrating the detail of the solder interconnection.

In FIG. 2, a memory plane assembly utilizing an asymmetrical connector board, shown in FIG. 2*a*, is illustrated. Memory planes 20 through 24 are arranged in vertical superposition. Each of the planes has a series of printed drive conductors, such as are illustrated by conductors 25,

26 and 27 corresponding to each of the *x* axis rows and *y* axis columns. On each plane, rectangular slots 19 are cut between each pair of drive conductors and intersect each adjacent drive conductor. The connector boards 11 are positioned in these rectangular slots 19 and the conducting segments 16 and 17 are soldered to the adjacent portions of the drive conductor strips 26 and 25. In this soldering process a fillet 30 is formed at the intersection between the printed circuit segment 16 and the printed drive conductors. Details of this solder fillet are illustrated in FIG. 2*b*.

The conductor segments 16 on face 12 of the connector strips 11 are spaced such that they interconnect the drive conductors corresponding to drive conductor 26 between planes 21 and 22 and planes 23 and 24. On the opposite face 14 of the connector strip 11 the segments 17 interconnect the drive connectors corresponding to drive conductor 25 between planes 20 and 21 and planes 22 and 23. In this arrangement of the memory assembly, then, the connections between adjacent drive conductors are made between offset pairs of planes by virtue of the choice of connector strip.

Figures 3, 3A, 4, 4A:
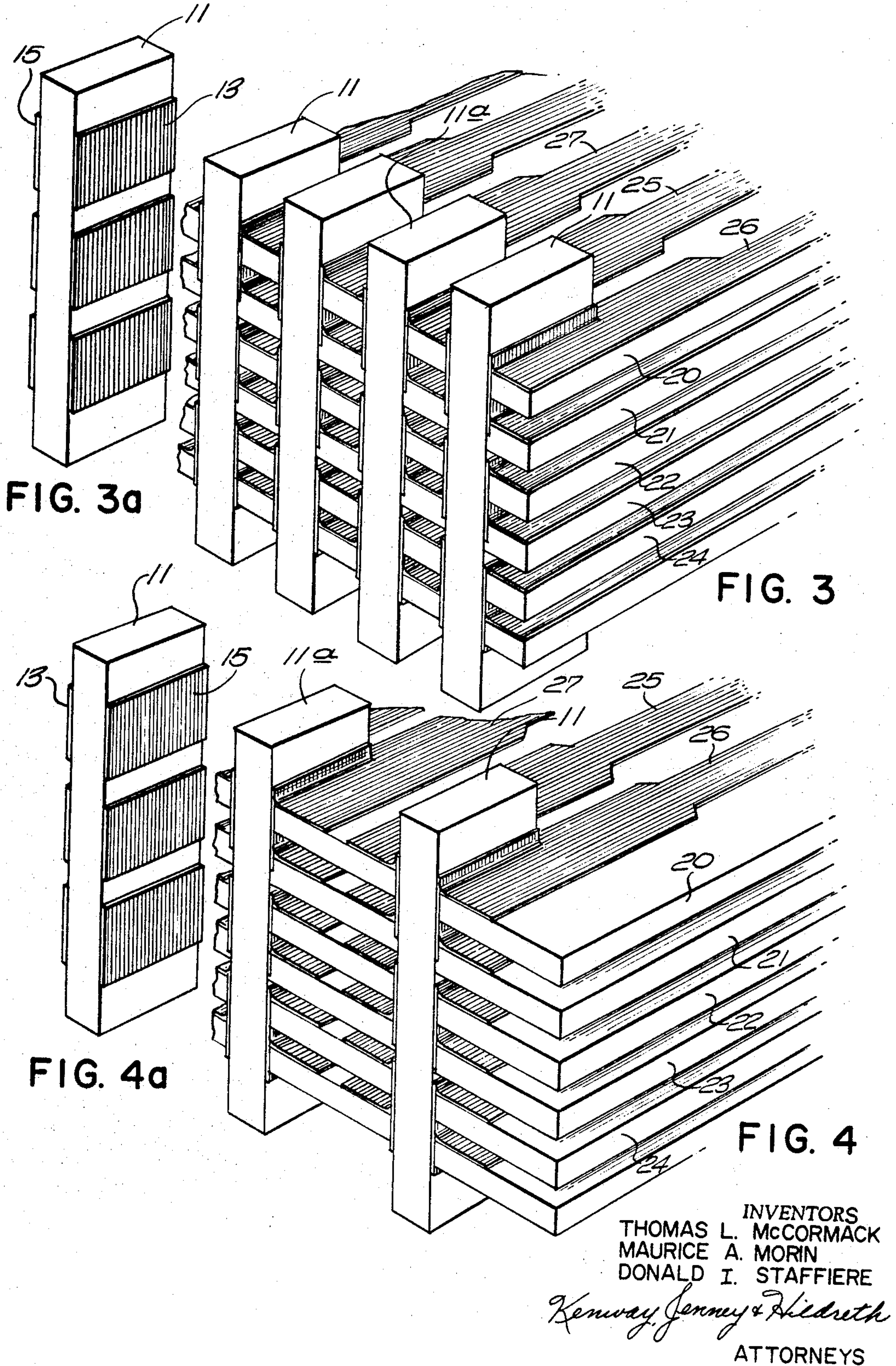
FIG. 3 is an illustration in perspective view of a portion of a memory array which includes a second embodiment of the connector system of the invention.
FIG. 3*a* is a perspective view of a connector board utilized in the embodiment of FIG. 3.
FIG. 4 is an illustration of a memory array utilizing a third embodiment of the connector system of this invention.
FIG. 4*a* is a perspective view of the connector board suitable for use in the embodiment of FIG. 4.

If the connector strip shown in FIG. 1*a* were employed, the interconnected assembly would have the configuration illustrated in FIG. 3. Since, in this arrangement the segments 13 and 15 on either side of the connector strip 11 are symmetrically positioned, then adjacent drive conductors 25 and 26 are interconnected at the same side of the assembly between the same pairs of planes. Thus drive conductors in alignment with drive conductor 26 are interconnected between plane 20 and 21, at this end of the assembly, and also those between planes 22 and 23. The drive conductors in alignment with drive conductor 25 are also connected at this end of the assembly between planes 20 and 21 and between planes 22 and 23.

In this arrangement, drive conductors, such as conductor 25, are electrically connected to their counterpart, on the adjacent plane by connections to conducting segments on both connector boards 11 and board **11*a***. This provides a redundant connection, thereby decreasing the probability of a faulty connection between these planes.

If the configuration illustrated in FIG. 3 is used and the soldering connections are made by a wave soldering technique, then a "slug" of solder will be created in the space between opposing faces of adjacent connector strips and will extend into the memory plane the depth of the slot 19. The resultant matrix of solder slugs provides significant mechanical support and rigidity to the assembly.

In the above described embodiment, every space between drive conductors on the memory plane has been slotted to provide for the connector strips. This arrangement is not, however, necessary. As illustrated in FIG. 4, slots maybe cut only between every other drive conductor. In this instance, if symmetrical strip connectors, such as illustrated in FIG. 4*a*, are used, vertically aligned drive conductors may be serially interconnected. Thus, by choice of connector boards and slot location, a variety of interconnections with the same memory plane stack are possible.

The dimensions of the connector strips will depend, as above indicated, on the spacing between planes and between drive conductors on the planes of a memory array. In a relatively high information density array, the drive conductors may be spaced between centers approximately .025 inch and the planes themselves may have a thickness of .030 inch with an inter-plane separation of .015 inch. With these dimensions of the memory array, a slot .012 inch wide and .030 inch deep has been cut into the edges of the memory planes and connector strips having faces .030 inch deep and a thickness of .012 inch have been used. The printed conductor segments on the faces, typically, have a vertical dimension of .075 inch.

The process for construction of the memory array would generally be as follows. The memory planes are formed by conventional techniques and assembled with inter-plane spacers in vertical registration generally as described in copending patent application Ser. No. 699,284. After assembly, slots are cut in each of the edges of the memory array, typically with a diamond cutting wheel. The array is disassembled and cleaned, for example with an alcohol and water flush, and then reassembled with the inter-plane spacer sealed between planes. These inter-plane spacers are generally .015 inch thick insulators extending around the periphery of the memory array at a point recessed back sufficiently from the edge to be beyond the inner edge of the slots. After the array has been re-assembled, the connector strips are located in the appropriate slots, and each side of the assembly is coated with flux and then wave soldered using a wave soldering technique whereby all of the connections on each side are made simultaneously. After each side has been so soldered, the entire assembly is cleaned in an ultrasonic degreaser or the like.

Having described the invention various modifications and improvements will appear to those skilled in the art and the invention should be construed as limited only by the spirit and scope of the appended claims.

What is claimed is:

1. In a memory assembly having an array of vertically stacked superimposed memory planes spaced apart a specific distance, each plane having printed drive conductors extending to the edges of said planes, an improved connecting means comprising:

a plurality of slots, of generally rectangular cross section, cut into the edges of said memory planes, at least one edge of each of said slots being contiguous with one of said printed drive conductors;

an elongated connector board formed of an insulating material, said connector board having, on one face, a series of conducting segments electrically isolated from one another, each of said segments extending in the direction of the long axis of said board a distance greater than said specific distance between two planes of said array, but less than the distance between three planes of said array, said connector board being positioned in vertically aligned slots in said memory array such that said conducting segments are adjacent to and soldered to said drive conductor areas contiguous to said slot edges for providing electrical interconnection between pairs of vertically aligned drive conductors.

2. A connecting means in accordance with claim 1 wherein said plurality of slots are positioned such that one edge of each of said slots is contiguous with one of said drive conductors and the opposite and parallel edge of said slot is contiguous with another of said drive conductors, said connector board being formed with a series of conducting segments of the same dimensions on opposite and parallel faces of said board.

3. A connector means in accordance with claim 2 wherein the conducing segments on both faces of said connector board are symmetrical with each other with respect to the long axis of said board so that said drive conductors contiguous to both edges of each slot on the same pairs of planes are interconnected.

4. A connecting means in accordance with claim 3 wherein said slots are cut into every space between drive conductors along at least one edge of said memory plane thereby providing redundant electrical connection between the vertically connected pair of drive conductors along said edge.

5. A connector means in accordance with claim 3 wherein said slots are cut into said planes only at every other spacing between conductors.

6. Connector means in accordance with claim 2 wherein said conducting segments on both faces of said connector board are asymmetrically disposed with respect to the longitudinal axis of said connector board such that the pairs of interconnected drive conductors on one side of said slots are vertically offset by one plane from the pairs of electrically interconnected drive conductors on the other side of said slots.

No references cited.

DARRELL L. CLAY, *Primary Examiner.*